United States Patent
Uehara et al.

(10) Patent No.: US 11,603,888 B2
(45) Date of Patent: Mar. 14, 2023

(54) TORSION DAMPER AND DAMPER DEVICE

(71) Applicant: EXEDY Corporation, Neyagawa (JP)

(72) Inventors: Hiroshi Uehara, Neyagawa (JP); Yoshiyuki Hagihara, Neyagawa (JP); Masahiro Maeda, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 243 days.

(21) Appl. No.: 17/071,604

(22) Filed: Oct. 15, 2020

(65) Prior Publication Data

US 2021/0131498 A1 May 6, 2021

(30) Foreign Application Priority Data

Oct. 31, 2019 (JP) .............................. JP2019-198318

(51) Int. Cl.
*F16D 3/10* (2006.01)
*F16F 15/14* (2006.01)
*F16F 15/123* (2006.01)
*F16F 15/127* (2006.01)

(52) U.S. Cl.
CPC .............. *F16D 3/10* (2013.01); *F16F 15/127* (2013.01); *F16F 15/12353* (2013.01); *F16F 15/1428* (2013.01); *F16D 2200/0034* (2013.01); *F16D 2300/22* (2013.01); *F16F 2224/02* (2013.01); *F16F 2232/02* (2013.01); *F16F 2234/02* (2013.01)

(58) Field of Classification Search
CPC .............. F16D 3/10; F16D 2200/0034; F16D 2300/22; F16F 15/12353; F16F 15/127; F16F 15/1428; F16F 2224/02; F16F 2232/02; F16F 2234/02
USPC ...................... 464/34, 68.91, 78, 85; 192/209
See application file for complete search history.

(56) References Cited

U.S. PATENT DOCUMENTS

| 2,674,863 | A | * | 4/1954 | Vincent | ............. | F16F 15/12333 |
| 3,156,106 | A | * | 11/1964 | Crane | .................. | E21B 17/073 |
| | | | | | | 464/78 |
| 5,167,582 | A | * | 12/1992 | Hunt | ......................... | F16D 3/74 |
| | | | | | | 464/78 |
| 7,445,553 | B2 | * | 11/2008 | Nakagaito | ............... | F16F 1/128 |
| | | | | | | 464/68.91 |

FOREIGN PATENT DOCUMENTS

JP 2000-205339 A 7/2000
SU 591637 * 2/1978 ...................... 464/85

* cited by examiner

*Primary Examiner* — Greg Binda
(74) *Attorney, Agent, or Firm* — United IP Counselors, LLC

(57) ABSTRACT

A torsion damper is configured to be disposed inside a coil spring. The torsion damper includes a body and a helical groove. The body is made of resin. Besides, the body has a columnar shape. The helical groove is provided on the outer peripheral surface of the body.

5 Claims, 6 Drawing Sheets

TORSION DAMPER AND DAMPER DEVICE

CROSS-REFERENCE TO RELATED APPLICATIONS

This application claims priority to Japanese Patent Application No. 2019-198318, filed on Oct. 31, 2019. The contents of that application are incorporated by reference herein in their entirety.

TECHNICAL FIELD

The present invention relates to a torsion damper and a damper device.

BACKGROUND ART

A damper device is used for absorbing torque fluctuations of an engine, a motor or so forth. The damper device is attached to, for instance, a flywheel or so forth. The damper device includes an input member, an output member and one or more coil springs. The input member and the output member are rotatable relative to each other. The input member and the output member are elastically coupled through the one or more coil springs.

Japan Laid-open Patent Application Publication No. 2000-205339 describes a damper device in which torsion dampers are disposed inside coil springs, respectively. A torque, when fluctuating acutely and suddenly, is transmitted through the torsion dampers. Each torsion damper is shaped to have a smaller diameter at a middle portion thereof than at both end portions thereof in order to adjust the stiffness thereof.

It is concerned that each torsion damper described above gets stuck at the both end portions thereof in between windings of each coil spring. In view of this, it is an object of the present invention to provide a torsion damper that can be prevented from getting stuck in between windings of a coil spring.

BRIEF SUMMARY

A torsion damper according to a first aspect of the present invention is disposed inside a coil spring. The torsion damper includes a body and a groove. The body is made of resin. Besides, the body has a columnar shape. The groove is provided on an outer peripheral surface of the body.

According to the configuration, the torsion damper can be adjusted in stiffness by the groove provided on the outer peripheral surface of the body. In other words, unlike a well-known torsion damper, the present torsion damper can be adjusted in stiffness without having a small diameter in a middle portion thereof. Because of this, the both ends of the torsion damper can be prevented from getting stuck in between windings of the coil soring.

Preferably, the groove extends in a helical shape.

Preferably, the groove is wound in a reverse direction to the coil spring.

Preferably, the groove extends along an axial direction of the body.

Preferably, the groove has a width less than a wire diameter of the coil spring.

Preferably, the groove includes a pair of sidewall portions and a bottom portion. The pair of sidewall portions slants to gradually approach to each other toward the bottom portion.

Preferably, the body is constant in diameter except for at portions thereof provided with the groove.

A damper device according to a second aspect of the present invention includes a first rotary member, a second rotary member, a coil spring and the torsion damper configured as any of the above. The first rotary member is disposed to be rotatable. The second rotary member is disposed to be rotatable relative to the first rotary member. The coil spring is a member through which the first and second rotary members are coupled to each other. The torsion damper is disposed inside the coil spring.

Overall, according to the present invention, the torsion damper can be prevented from getting stuck in between windings of the coil spring.

DETAILED DESCRIPTION

A preferred embodiment of a torsion damper according to the present invention will be hereinafter explained with reference to drawings.

[Entire Configuration]

Figure 1:
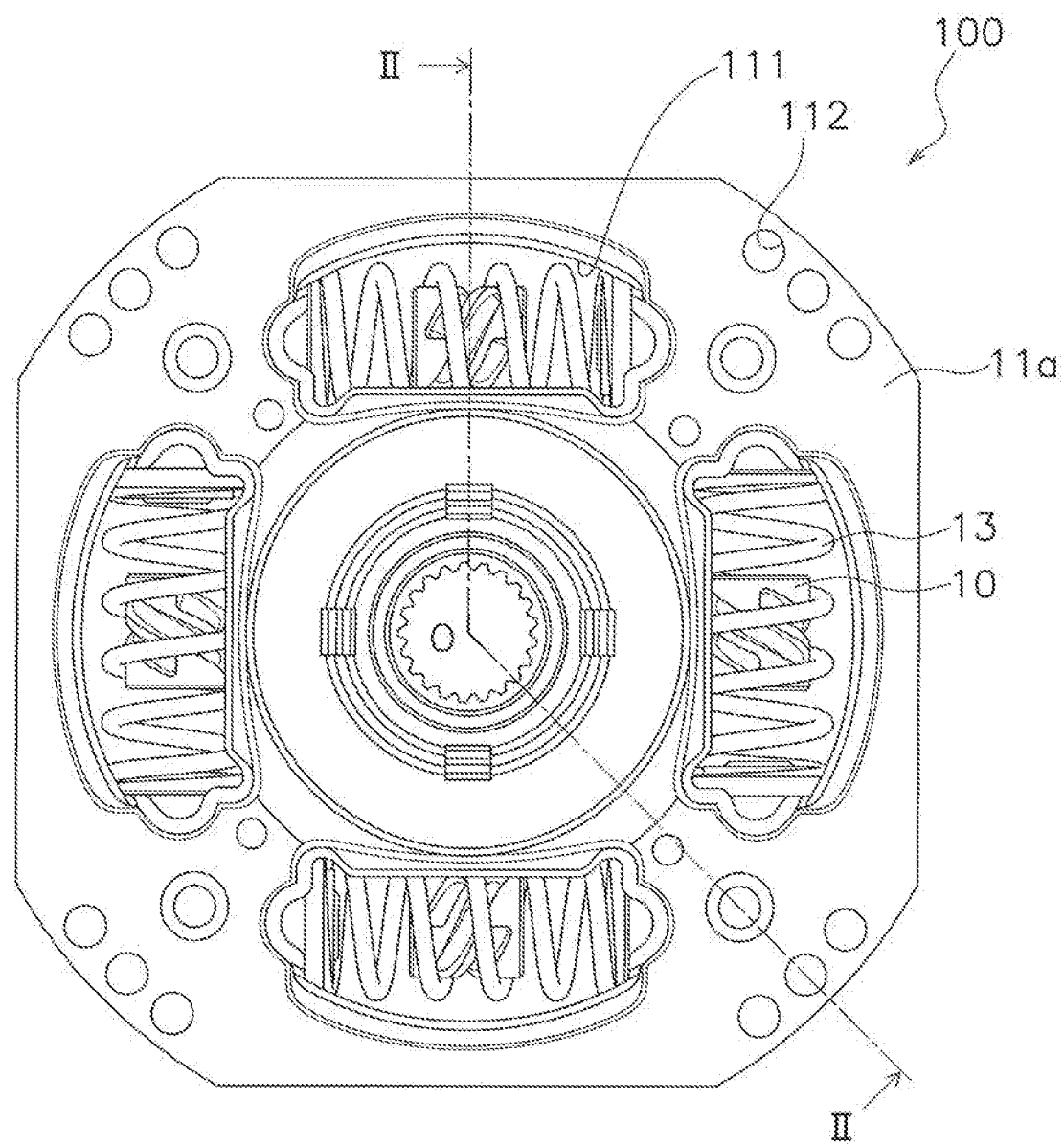
FIG. 1 is a front view of a damper device.
Figure 2:
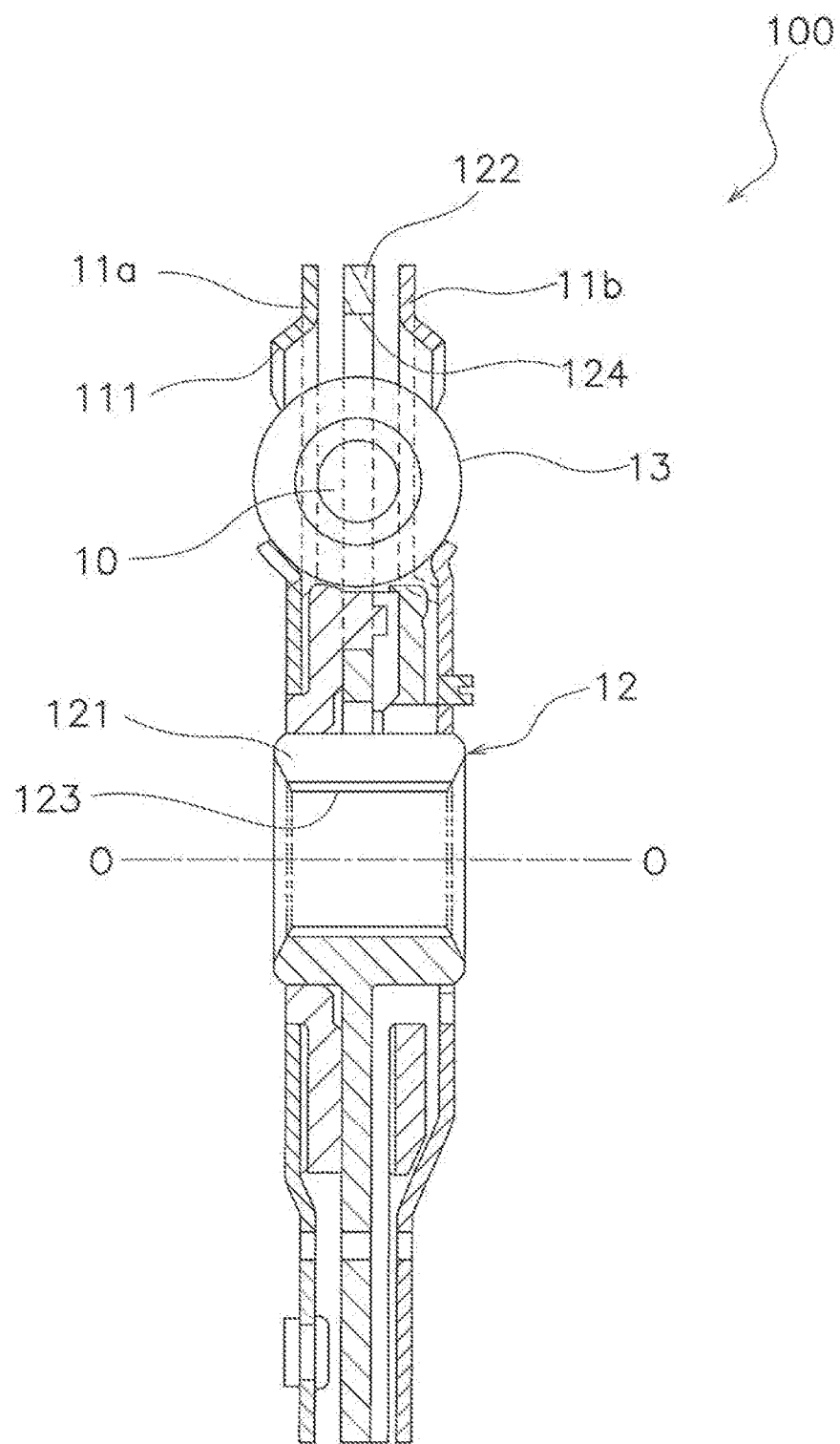
FIG. 2 is a cross-sectional view of FIG. 1 taken along line II-II.

FIG. 1 is a front view of a damper device 100, whereas FIG. 2 is a cross-sectional view of FIG. 1 taken along line II-II. In FIG. 2, for instance, an engine is disposed on the left side of the damper device 100, whereas a drive unit, including a transmission and so forth, is disposed on the right side of the damper device 100. It should be noted that in the following explanation with FIGS. 1 and 2, the term "axial direction" refers to an extending direction of a rotational axis O of the damper device 100. Besides, the term "radial direction" refers to a radial direction of an imaginary circle about the rotational axis O of the damper device 100. Furthermore, the term "circumferential direction" refers to a circumferential direction of the imaginary circle about the rotational axis O of the damper device 100.

The damper device 100 is a device provided between a flywheel and an input shaft of the drive unit in order to attenuate fluctuations in torque transmitted between the engine and the drive unit.

As shown in FIGS. 1 and 2, the damper device 100 includes a pair of input plates 11$a$ and 11$b$ (exemplary first rotary member), a hub flange 12 (exemplary second rotary member), a plurality of coil springs 13 and a plurality of torsion dampers 10.

<Input Plates 11$a$ and 11$b$>

The pair of input plates 11$a$ and 11$b$ is disposed away from each other at an interval in the axial direction. For example, a torque limiter unit (not shown in the drawings) and/or so forth can be coupled to at least one of the pair of input plates 11a and 11b.

Each input plate 11a, 11b includes a plurality of window portions 111. The plural window portions 111 are disposed at intervals in the circumferential direction. Each window portion 111 includes a hole axially penetrating therethrough and a holding portion provided on the circumferential edge of the hole. One of the pair of input plates 11a and 11b is provided with a plurality of rivet holes 112 in the outer peripheral portion thereof so as to attach the torque limiter unit and/or so forth thereto. The pair of input plates 11a and 11b is fixed to each other by one or more rivets and is therefore immovable relative to each other in the axial direction and a rotational direction.

<Hub Flange 12>

The hub flange 12 is disposed to be rotatable relative to each input plate 11a, 11b. The hub flange 12 includes a hub portion 121 and a flange portion 122. The hub portion 121 has a tubular shape and is provided with a spline hole 123 on the inner peripheral surface thereof. The spline hole 123 enables the input shaft of the drive unit to be spline-coupled thereto.

The flange portion 122 extends radially outward from the outer peripheral surface of the hub portion 121. The flange portion 122 has a disc shape. The flange portion 122 is disposed between the pair of input plates 11a and 11b.

The flange portion 122 includes a plurality of accommodation portions 124. The accommodation portions 124 are provided in corresponding positions to pairs of window portions 111 of the pair of input plates 11a and 11b.

<Coil Springs 13>

The pair of input plates 11a and 11b and the hub flange 12 are elastically coupled through the respective coil springs 13. The coil springs 13 are accommodated in the accommodation portions 124 of the hub flange 12, respectively. Each coil spring 13 is axially and radially held by the pairs of window portions 111 of the pair of input plates 11a and 11b. Besides, each coil spring 13 is capable of circumferentially making contact at the both end surfaces thereof with the end surfaces of each pair of window portions 111. Each coil spring 13 is also capable of circumferentially making contact at the both end surfaces thereof with the end surfaces of each accommodation portion 124.

<Torsion Dampers 10>

The torsion dampers 10 are disposed inside the coil springs 13, respectively. Each torsion damper 10 makes contact at the outer peripheral surface thereof with the inner peripheral surface of each coil spring 13. Because of this, each torsion damper 10 is held by each coil spring 13. While each coil spring 13 is not being compressed, each torsion damper 10 does not make contact at the both end surfaces thereof with any of the hub flange 12 and the pair of input plates 11a and 11b.

Figure 3:
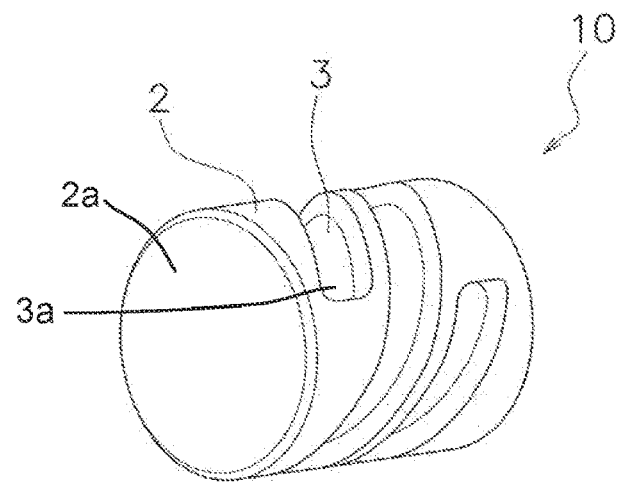
FIG. 3 is a perspective view of a torsion damper.
Figure 4:
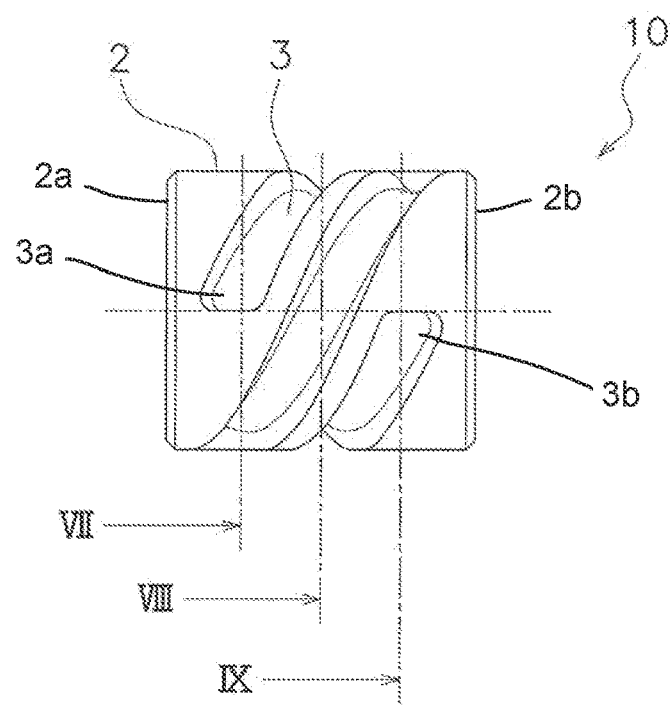
FIG. 4 is a side view of the torsion damper.

FIG. 3 is a perspective view of each torsion damper 10, whereas FIG. 4 is a side view of each torsion damper 10. It should be noted that in the following explanation with FIGS. 3 and 4, the term "axial direction" refers to an extending direction of each torsion damper 10. Besides, the term "radial direction" refers to a radial direction of an imaginary circle about a center axis of each torsion damper 10. Furthermore, the term "circumferential direction" refers to a circumferential direction of the imaginary circle about the center axis of each torsion damper 10.

As shown in FIGS. 3 and 4, each torsion damper 10 includes a body 2 and a plurality of grooves 3. It should be noted that in the present preferred embodiment, each torsion damper 10 includes two grooves 3.

The body 2 has a columnar shape. The body 2 is constant in diameter along the axial direction except for at portions thereof provided with the grooves 3. In other words, both end portions and a middle portion of the body 2 are approximately identical in diameter. It should be noted that the body 2, when provided with chamfered portions as seen in the present preferred embodiment, is constant in diameter along the axial direction except for the chamfered portions and the grooves 3.

The body 2 is made of resin. Specifically, the body 2 can be made of polyamide elastomer, polyester elastomer or so forth.

The grooves 3 are provided on the outer peripheral surface of the body 2. Each torsion damper 10 is adjusted in stiffness by the grooves 3 provided thereon. Each groove 3 helically extends on the outer peripheral surface of the body 2. It should be noted that the grooves 3 extend approximately in parallel to each other.

As shown in FIGS. 3 and 4, both end portions 3a and 3b of each groove 3 are not connected to both end surfaces 2a and 2b of the body 2. In other words, the both end portions 3a and 3b of each groove 3 are spaced apart from the both end surfaces 2a and 2b of the body 2 at intervals, respectively. Each groove 3 is not axially opened at the both end portions thereof.

Figure 5:
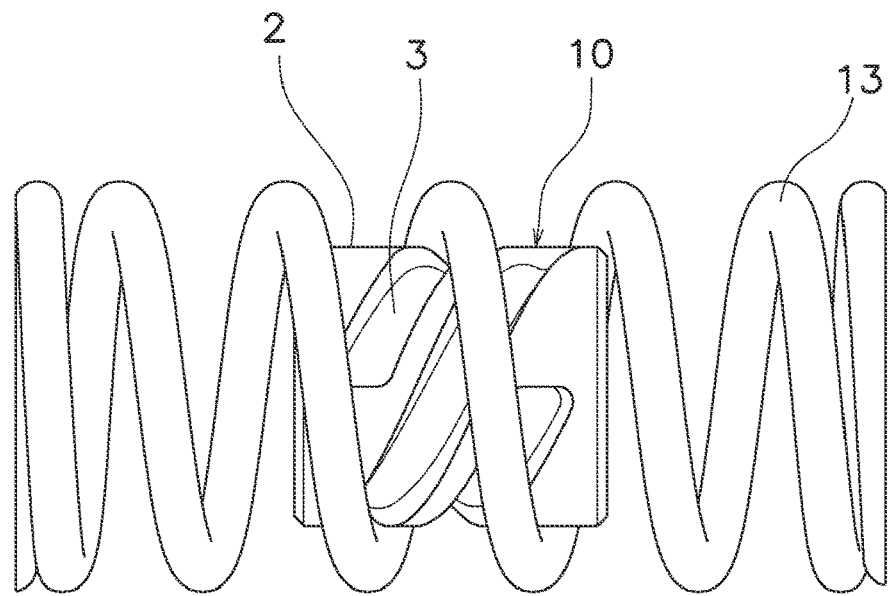
FIG. 5 is a side view of the torsion damper disposed inside a coil spring.

As shown in FIG. 5, each groove 3, having the helical shape, is wound in a reverse direction to each coil spring 13. Because of this, each torsion damper 10 can be prevented from getting stuck in between windings of each coil spring 13 as reliably as possible. It should be noted that the body 2 is greater in length than an inter-winding gap of each coil spring 13.

Figure 6:
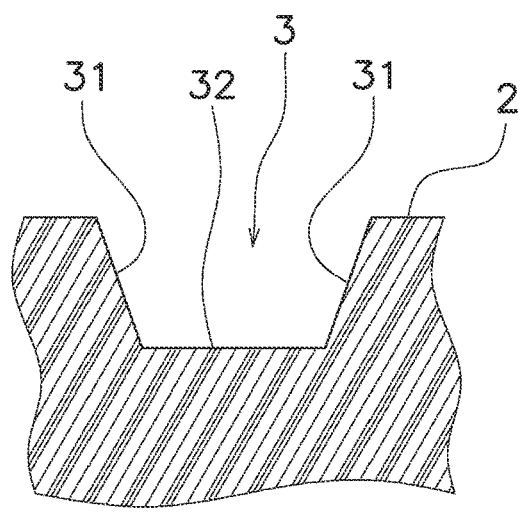
FIG. 6 is a cross-sectional diagram showing a groove of the torsion damper.

FIG. 6 is an enlarged cross-sectional view of each groove 3. It should be noted that in the following explanation with FIG. 6, the term "axial direction" refers to the extending direction of each torsion damper 10. Besides, the term "radial direction" refers to the radial direction of the imaginary circle about the center axis of each torsion damper 10. Furthermore, the term "circumferential direction" refers to the circumferential direction of the imaginary circle about the center axis of each torsion damper 10.

As shown in FIG. 6, each groove 3 includes a pair of sidewall portions 31 and a bottom portion 32. The pair of sidewall portions 31 faces both axial sides. The pair of side wall portions 31 are opposed to each other. The bottom portion 32 faces radially outward. The pair of sidewall portions 31 slants to gradually approach to each other toward the bottom portion 32. In other words, each groove 3 is widened outward.

Figure 7:
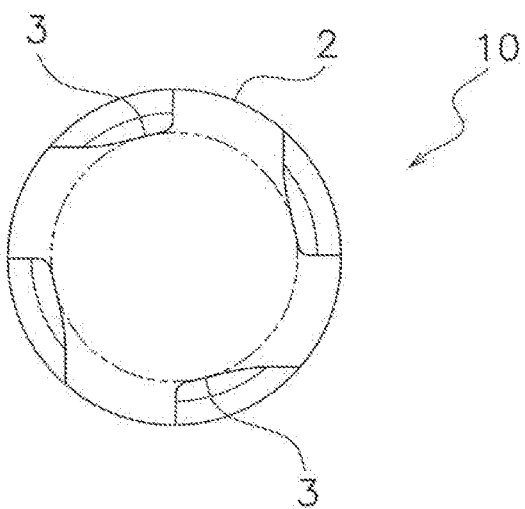
FIG. 7 is a cross-sectional view of FIG. 4 taken along line VII-VII.
Figure 8:
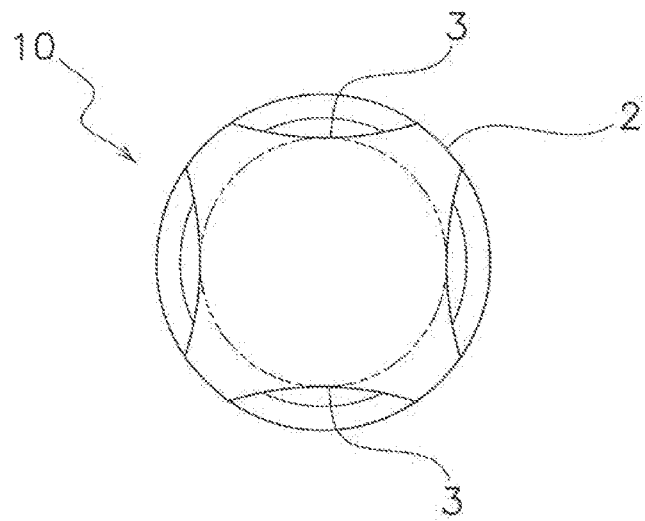
FIG. 8 is a cross-sectional view of FIG. 4 taken along line VIII-VIII.
Figure 9:
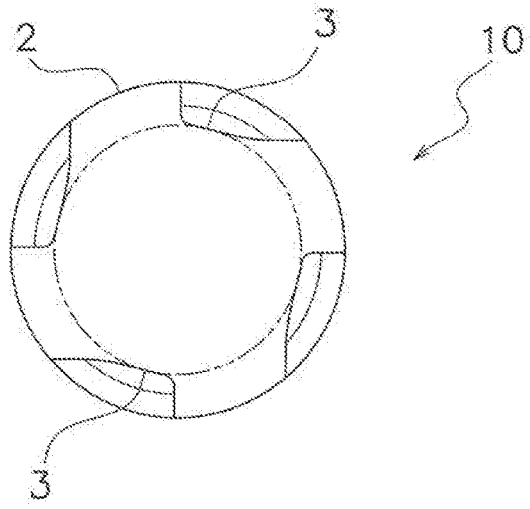
FIG. 9 is a cross-sectional view of FIG. 4 taken along line IV-IV.

As shown in FIGS. 7 to 9, each groove 3 is constant in depth. Besides, the grooves 3 are identical in depth. Because of this, distance between the bottom portion 32 of one groove 3 and that of the other groove 3 is constant along the axial direction.

[Actions]

Power, generated in the engine, is inputted to the damper device 100 through the flywheel and so forth. In the damper device 100, the power is inputted to the pair of input plates 11a and 11b and is then transmitted therefrom through the coil springs 13 to the hub flange 12. Subsequently, the power is further transmitted from the hub flange 12 to the transmission and so forth disposed on the output side.

Detailedly, in the damper device 100, the coil springs 13 are compressed when the power is transmitted thereto from the pair of input plates 11a and 11b. Besides, the coil springs 13 are repeatedly compressed and extended by torque fluctuations. Here in occurrence of excessive torque fluctuations, the coil springs 13 are further compressed, whereby the power is transmitted from the pair of input plates 11a and 11b to the hub flange 12 not through the coil springs 13 but through the torsion dampers 10. The torsion dampers 10 are herein compressed, whereby the excessive torque fluctuations can be absorbed.

Other Preferred Embodiments

The present invention is not limited to the preferred embodiment described above, and a variety of changes or modifications can be made without departing from the scope of the present invention.

For example, in the aforementioned preferred embodiment, each groove 3 is shaped to extend in the helical shape. However, the shape of each groove 3 is not limited to this. For example, each groove 3 can be shaped to extend along the axial direction of the body 2. In this case, each torsion damper 10 is preferably provided with a plurality of grooves 3. The grooves 3 are preferably disposed at equal intervals in the circumferential direction of each torsion damper 10.

Figure 10:
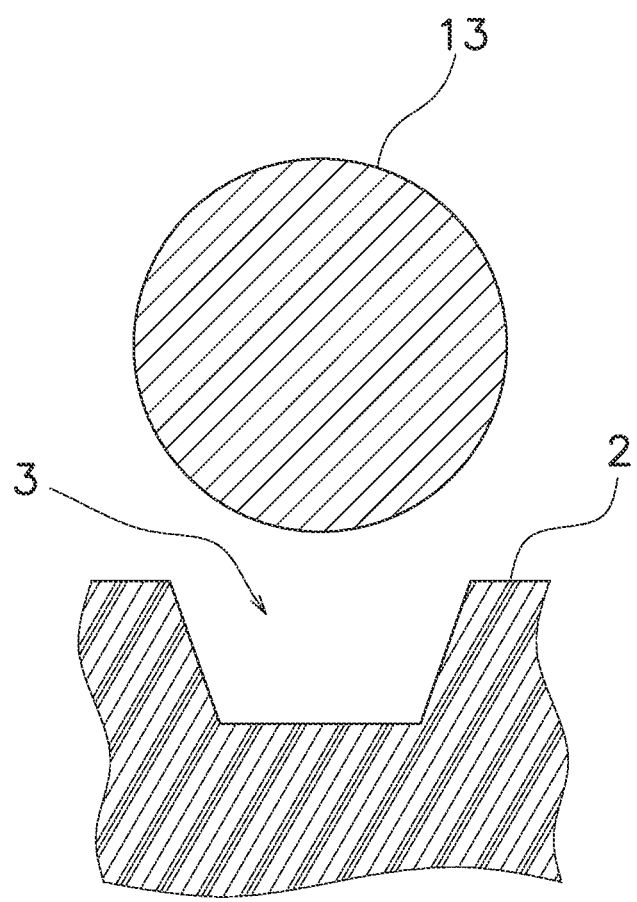
FIG. 10 is a cross-sectional diagram showing the groove of the torsion damper and the wire diameter of the coil spring.

Alternatively, each groove 3 can be shaped to annularly extend along the outer peripheral surface of the body 2. In this case, each torsion damper 10 is preferably provided with a plurality of grooves 3. Besides, as shown in FIG. 10, each groove 3 preferably has a width less than the wire diameter of each coil spring 13.

REFERENCE SIGNS LIST

10 Torsion damper
2 Body
3 Groove
31 Sidewall portion
32 Bottom portion

What is claimed is:

1. A damper device comprising:
a first rotary member disposed to be rotatable;
a second rotary member disposed to be rotatable relative to the first rotary member;
a coil spring through which the first and second rotary members are coupled to each other; and
a torsion damper disposed inside the coil spring, the torsion damper including
a body made of resin, the body having a columnar shape with two end surfaces, and
a helical groove provided on an outer peripheral surface of the body, two end portions of the helical groove being spaced apart from the two end surfaces of the body, respectively.

2. The damper device according to claim 1, wherein the groove has a width less than a wire diameter of the coil spring.

3. The damper device according to claim 1, wherein
the groove includes a pair of sidewall portions and a bottom portion, and
the pair of sidewall portions slants to approach to each other toward the bottom portion.

4. The damper device according to claim 1, wherein the body is constant in diameter except for at portions thereof provided with the groove.

5. A damper device comprising:
a first rotary member disposed to be rotatable;
a second rotary member disposed to be rotatable relative to the first rotary member;
a coil spring through which the first and second rotary members are coupled to each other; and
a torsion damper disposed inside the coil spring, the torsion damper including
a body made of resin, the body having a columnar shape, and
a helical groove provided on an outer peripheral surface of the body, wherein
the helical groove is wound in a reverse direction to the coil spring.

* * * * *